Jan. 17, 1956 J. C. MARSH 2,731,589
HIGH VOLTAGE APPARATUS
Filed Sept. 13, 1954
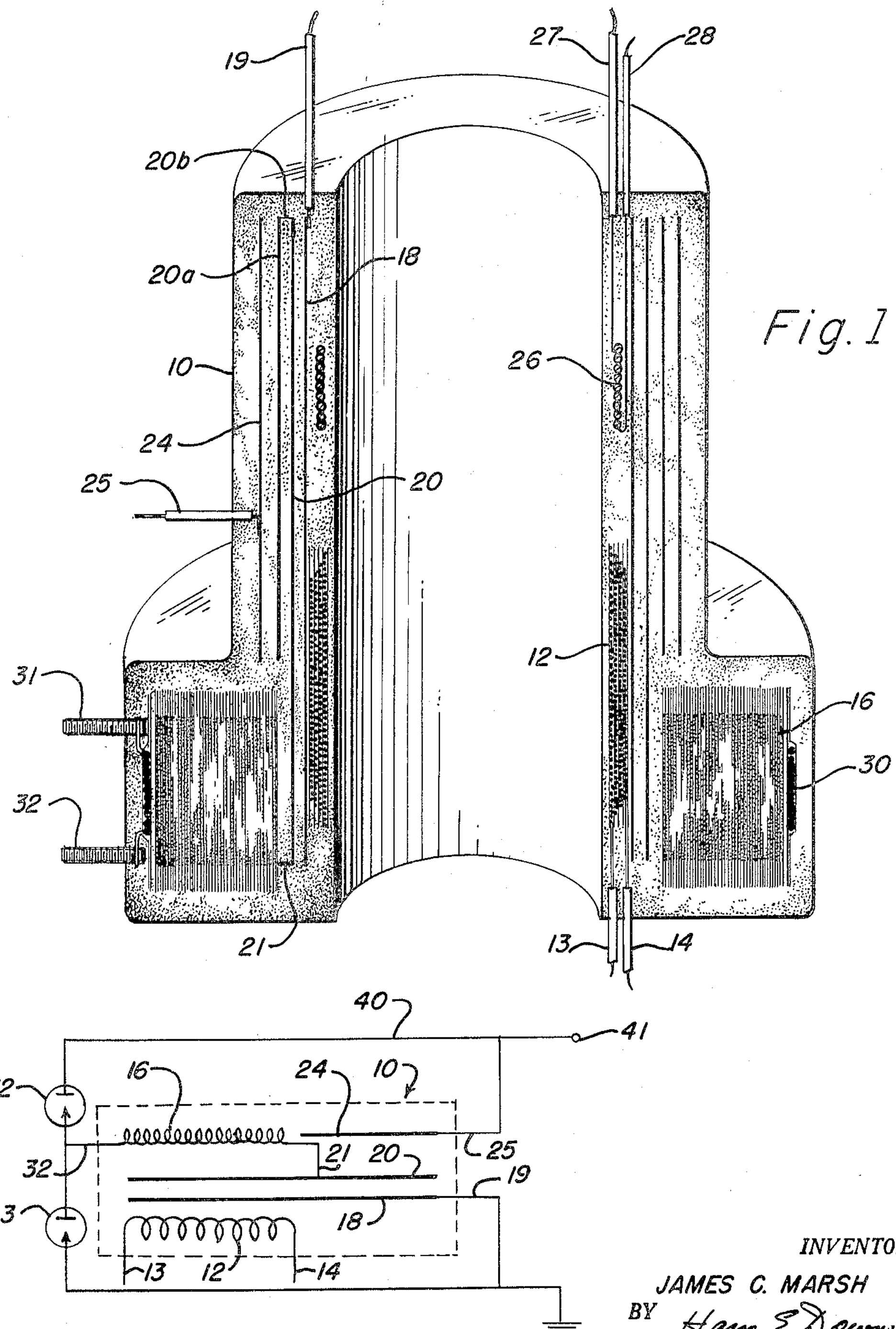
INVENTOR.
JAMES C. MARSH
BY Harry E. Downer
Mulkey Olmsow.
Attorneys United States Patent Office 2,731,589 Patented Jan. 17, 1956

2,731,589

HIGH VOLTAGE APPARATUS

James C. Marsh, Indianapolis, Ind., assignor to Ransburg Electro-Coating Corp., Indianapolis, Ind., a corporation of Indiana Application September 13, 1954, Serial No. 455,520

9 Claims. (Cl. 321—15)

This invention relates to apparatus for the generation and supply of high voltage and in particular provides an integral transformer and capacitor assembly for a high voltage circuit.

Power supplies for obtaining direct current at high voltages from a low voltage alternating current are well known and in wide use in electrostatic painting, dust precipitation, X-ray and other fields. In certain high voltage power supplies a circuit of rectifiers and capacitors is used to obtain a direct current output voltage of twice the peak voltage of the transformer and such a circuit is known as a doubler circuit. In such a doubler circuit two capacitors and two rectifiers are normally used, one capacitor serving each rectifier. In high voltage transformers it is customary to use plates known as arc shields or corona bands associated with the secondary windings as protective devices. In such circuits it is also customary to provide an electrostatic shield or plate over the primary windings connected to ground to prevent the transfer of electrostatic energy between the primary and secondary windings.

My invention consists of a novel arrangement of elements in a rectified high voltage circuit which will eliminate the necessity for one or more of the separate conventional capacitors heretofore used in such circuits. By utilizing the natural capacitance of the plates normally used only as arc and electrostatic shields in the transformer, the conventional capacitors are eliminated and the shields are made to serve in the dual capacity of shields and capacitors. Apparatus in accordance with my invention is particularly adapted to a construction whereby both the transformer and capacitors of the high voltage circuit are moulded together in a plastic composition into an integral assembly which is especially rugged and fool-proof. This assembly in addition to eliminating the cost of separate condensers, is more compact and in a high voltage circuit requires considerably less space and the use of less insulating material than was heretofore possible in conventional circuits.

The invention will now be described in detail with reference to the accompanying drawings in which:

Fig. 1 is a cross sectional side view of an embodiment of my invention; and

Fig. 2 is a diagram of an electrical circuit embodying my invention.

My invention may assume many different forms and the above mentioned drawings and the following description should be understood as merely illustrative of the principles of the invention. The scope of the invention is not limited to the following description of one embodiment thereof which has been constructed and successfully operated.

Referring first to Fig. 1, there is shown a hollow cylindrical housing 10 made of highly insulating plastic material such as an epoxy resin. Preferably the housing is of moulded construction and contains a plurality of electrical elements embedded within the housing in fixed relation to each other. Such construction provides excellent insulation for the various electrical elements of the assembly and at the same time provides a compact integral assembly which can be easily mounted around a conventional transformer core.

Housing 10 contains an annular primary transformer coil 12 of copper wire windings which is provided with exterior connecting wires 13 and 14. Encircling primary coil 12 and operatively associated therewith is a secondary transformer coil 16 comprising many layers of many windings each of fine copper wire. Also encircling primary coil 12 and lying in part between primary coil 12 and secondary coil 16 is a first metal plate 18 formed into a longitudinally split, hollow cylinder and provided with an exterior connecting wire 19.

A second plate 20, also made of metal and formed into a longitudinally split hollow cylinder, encircles the first plate 18 and lies in part between the first plate and the secondary coil. In the embodiment shown plate 20 includes an additional cylindrical metal plate **20*a* electrically connected by one or more wires 20*b* to second plate 20. In electrical effect plates 20 and 20*a* and wire 20*b* are a single electrical element or plate which, for convenience of construction, has been in effect doubled back on itself in order that an unduly extended continuous plate 20 is not required. Plate 20 is connected to one end of secondary coil 16 by suitable means such as wire 21**.

A third plate 24, also of metal and in the form of a split hollow cylinder, surrounds the upper portion of second plate 20. Third plate 24 is provided with an exterior connecting wire 25. It is understood plates 18, 20 and 24 cannot be geometrically completed hollow cylinders as such form would interfere with the induced field of force between the transformer coils.

When the assembly constructed in accordance with my invention is used in a doubler circuit requiring separate currents to supply heating power to the filaments of two rectifying tubes, housing 10 may contain a second secondary coil 26 which is provided with exterior wires 27 and 28 for connection to the heating element of a rectifier tube maintained at low voltage, and also a third secondary coil 30 provided with exterior terminals 31 and 32 for connection to the heating element of a second rectifier tube which is maintained at high voltage. Terminals 31 and 32 also serve as exterior connections for the main high voltage secondary coil 16. Since the heating element circuits are conventional they are not shown in the circuit diagram now to be described.

Turning to Fig. 2 there is shown a diagram of a high voltage doubler circuit which embodies my invention and which utilizes the electrical elements described above. Dotted line 10 represents a housing which encompasses the electrical elements contained within housing 10 as shown in Fig. 1, although it is to be understod that my invention is not limited to a moulded plastic assembly of electrical elements.

A high voltage line 40 is provided to supply high voltage to a terminal 41. A pair of rectifiers 42 and 43 are connected in series between ground and high voltage line 40 in such a way that electrons can pass only in the direction from ground to the high voltage line but not in the reverse direction. Rectifiers 42 and 43 are preferably of the high vacuum tube type but may be selenium or mechanical rectifiers as my invention is not limited to any particular form of the rectifiers. One end of the secondary coil 16 is connected through its external connection 32 to the line between rectifiers 42 and 43. Plate 18 is connected through wire 19 to ground. Plate 24 is connected through wire 25 to high voltage line 40. The connecting wires 13 and 14 of primary coil 12 are connected to a source of low voltage alternating current which is not shown.

When a commercial alternating voltage is applied across wires 13 and 14, the resultant current flow through primary coil 12 induces a relatively high alternating voltage in secondary coil 16. When the induced voltage in the secondary coil is such as to cause the flow of electrons to the left, that is, through coil 16 and terminal 32, the electrons will pass through rectifier 42 to high voltage line 40. Plates 24 and 20 will serve as a capacitor to store electrical energy created by the electron flow of this portion of the alternating cycle. Then when the induced voltage is such as to cause electron flow in the opposite direction plates 20 and 18 will serve as a second capacitor to store electrical energy created by the second portion of the cycle.

Since the two capacitors comprising plates 18, 20 and 24 are in series between the high voltage line and ground, the voltage supplied through line 40 to terminal 41 will be twice the peak voltage of secondary coil 16. While plates 18 and 20 serve as the plates of capacitors in the doubler circuit just described, such plates will also serve as shields to protect the windings of the secondary coil 16 from voltage stresses and prevent the transfer of electrostatic energy between the primary and secondary coils.

I claim:

1. A doubler circuit for producing rectified high voltage comprising: a high voltage supply line, a source of low voltage alternating current, a transformer core, an annular primary transformer coil mounted over said core and connected to said low voltage current source, an annular secondary transformer coil encircling said primary coil, a first split cylindrical plate lying in part between said primary coil and said secondary coil and connected to ground, a second split cylindrical plate spaced from said first plate and lying in part between said primary coil and said secondary coil and connected to an end of said secondary coil, a third split cylindrical plate surrounding a portion of said second plate and connected to said high voltage supply line, and a pair of rectifiers in series between ground and said high voltage line connected to pass electrons in the same direction between ground and said high voltage line, the end of said secondary coil opposite to the end connected to said second plate being connected between said rectifiers, said first and second cylindrical plates serving as one capacitor and said second and third cylindrical plates serving as another capacitor in the doubler circuit.

2. A circuit according to claim 1 wherein the primary coil, the secondary coil, and the capacitor plates are moulded together in fixed relation to each other in an insulating plastic composition to form a hollow cylindrical assembly for mounting on the transformer core.

3. A circuit comprising: a high voltage line, a rectifier connected to pass electrons in the same direction between ground and said high voltage line, a transformer comprising a primary coil and a secondary coil, a capacitor comprising two separate plates each lying in part between the said primary and secondary coils of the transformer, one of the plates of said capacitor being connected to one end of said secondary coil and the other of said plates being connected to ground, and the other end of said secondary coil being connected between said rectifier and said high voltage line, the plates of said capacitor also serving as shielding plates between said primary and secondary coils.

4. An assembly for use in a circuit for producing rectified high voltage comprising a housing of insulating material and moulded therein: a transformer comprising a primary coil and a secondary coil and a capacitor comprising two separate plates, each of said plates lying in part between the primary coil and the secondary coil of said transformer, one of said plates being connected to said secondary coil and the other of said plates being connected to ground, and the plates of said capacitor also serving as electrostatic shields between said primary coil and said secondary coil.

5. A circuit for producing rectified high voltage comprising: a source of low voltage alternating current, a primary transformer coil connected to said low voltage current source, a secondary transformer coil operatively associated with said primary coil, a high voltage line, a first plate lying in part between said primary coil and said secondary coil and connected to a point of reference potential substantially different from the potential of said high voltage line, a second plate lying in part between said first plate and said secondary coil and connected to one end of said secondary coil, a third plate lying on the opposite side of said second plate from said first plate and connected to said high voltage line, and two rectifiers in series between said point of reference potential and said high voltage line connected to pass electrons in the same direction between said point of reference potential and said high voltage line only, the end of said secondary coil opposite to its end connected to said second plate being connected between said rectifiers, said first and second plates serving as one capacitor and said second and third plates serving as another capacitor in the high voltage circuit.

6. An assembly for use in a circuit for producing rectified high voltage comprising a housing of moulded insulating material and within said housing the following electrical elements: a primary transformer coil, a secondary transformer coil operatively associated with said primary transformer coil, a wire from one end of said secondary coil to the exterior of said housing, a first metal plate lying in part between said primary and secondary coils, a wire from said first plate to the exterior of said housing, a second metal plate lying in part between said first plate and said secondary coil, a wire connecting said second plate and said secondary coil, a third metal plate lying on the opposite side of said second plate from said first plate, and a wire from said third plate to the exterior of said housing, all of the aforesaid elements being moulded in fixed relation to each other within said housing.

7. An assembly for a circuit producing rectified high voltage comprising a hollow cylindrical housing made of plastic insulating material and moulded within said housing in fixed relation to each other the following electrical elements: an annular primary transformer coil having connections to the exterior of said housing, an annular secondary transformer coil encircling said primary coil having a connection to the exterior of said housing, a first hollow metal cylinder lying in part between said primary and secondary coils, a connection between said first cylinder and the exterior of said housing, a second hollow metal cylinder spaced from said first metal cylinder and lying in part between said first metal cylinder and said secondary coil, a connection between said second cylinder and said secondary coil, a third hollow metal cylinder encircling a portion of said first cylinder, and a connection between said third cylinder and the exterior of said housing.

8. A doubler circuit for producing rectified high voltage comprising: a high voltage supply line, a source of low voltage alternating current, a transformer core, a primary transformer coil mounted on said core and connected to said low voltage source, a secondary transformer coil mounted on said core, a capacitor having three plates, two of said plates arranged to serve as shielding plates for said primary and secondary coils, one of said two plates being connected substantially directly to a point of reference potential substantially different from the potential of said high voltage supply line, the second of said two plates being arranged to provide an arc shield for said secondary coil, said second plate being connected substantially directly to one end of said secondary coil, the third of said three plates being connected substantially directly to said high voltage supply line, a pair of rectifiers series connected to conduct current in the same direction between said high voltage supply line and said point of reference potential, and means connecting the other end of said secondary coil to the junction between said pair of rectifiers.

9. A circuit for producing rectified high voltage comprising: a high voltage line, a rectifier connected in a series circuit subsisting between said high voltage line and a point of reference potential substantially different from the potential of said high voltage line, a transformer comprising a primary coil and a secondary coil, one end of said secondary coil being coupled to said high voltage line, and a capacitor comprising at least two separate plates, said plates arranged to serve as shielding plates for said primary and secondary coils, one of said plates being connected directly to said point of reference potential and another of said plates being arranged to provide an arc shield for said secondary coil, said second mentioned plate being connected substantially directly to the end of said secondary coil opposite to said one end of said secondary coil.

References Cited in the file of this patent

UNITED STATES PATENTS

| | | |
|---|---|---|
| 1,742,682 | Beers | Jan. 7, 1930 |
| 1,782,228 | Bartley et al. | Nov. 18, 1930 |